United States Patent [19]

Sieverding

[11] Patent Number: 4,833,193

[45] Date of Patent: May 23, 1989

[54] NOVEL PRESSURE SENSITIVE ADHESIVES

[76] Inventor: David L. Sieverding, 1231 Caridad Ct., Rohnert Park, Calif. 94928

[21] Appl. No.: 85,116

[22] Filed: Aug. 14, 1987

[51] Int. Cl.[4] .............................. C08K 5/00; C08J 7/04
[52] U.S. Cl. ..................................... 524/486; 428/220; 428/355; 446/385; 446/486; 524/474; 524/476; 524/505
[58] Field of Search ............... 524/505, 476, 474, 486; 446/486, 385; 428/355, 220

[56] References Cited

U.S. PATENT DOCUMENTS

| | | | |
|---|---|---|---|
| 4,313,867 | 2/1982 | Duvdeuani | 524/505 |
| 4,369,284 | 1/1983 | Chen | 524/505 |
| 4,495,323 | 1/1985 | Collins | 524/505 |
| 4,539,364 | 9/1985 | Pollet et al. | 428/391 |
| 4,618,213 | 10/1986 | Chen | 524/505 |
| 4,640,727 | 2/1987 | Janssen | 428/345 |
| 4,650,822 | 3/1987 | Veazey et al. | 524/376 |
| 4,652,491 | 3/1987 | Gobran | 524/275 |
| 4,680,333 | 7/1987 | Davis | 524/490 |
| 4,683,268 | 7/1987 | Ahner | 525/237 |
| 4,699,842 | 10/1987 | Jorgensen et al. | 428/354 |
| 4,699,941 | 10/1987 | Salerno | 524/333 |
| 4,709,982 | 12/1987 | Corne et al. | 524/505 |

*Primary Examiner*—Herbert J. Lilling
*Attorney, Agent, or Firm*—George A. Skoler

[57] ABSTRACT

This invention relates to relatively thick pressure sensitive adhesive films comprising a homogeneous mixture based on 100% of the solids weight of the adhesive film, (i) at least 20 weight % of a low molecular weight resin produced by the polymerization and hydrogenation of styrenic monomer feedstock having a ring and ball softening point of about 10°–45° C., (ii) from about 2 to about 40 weight % of a triblock copolymer with a saturated elastomeric block in the center and a thermoplastic block on each end alone or in combination with a diblock copolymer of a hard thermoplastic block and a saturated, soft ethylene-propylene polymeric block, and (iii) up to about 80 weight % of a mineral oil.

12 Claims, No Drawings

NOVEL PRESSURE SENSITIVE ADHESIVES

BRIEF SUMMARY OF THE INVENTION

This invention relates to thick gel-appearing pressure sensitive adhesives films of at least 1 mil in thickness that release from a surface by adhesive failure, not cohesive failure, and which can be repeatedly used and reused. They are tacky to the touch and cleanly peel from the skin yet retain exceptional adhesive qualities to a wide variety of materials. Certain of the adhesives are distinquished for their ability to bond difficult to bond surfaces as polyethylene, polypropylene and fluorinated hydrocarbon plastics. Others have a soft feel which make them eminently suitable for skin applications. The adhesives of the invention comprise a homogeneous mixture containing, based on 100% of the solids weight of the adhesive, (i) at least 20 weight % of a low molecular weight resin produced by the polymerization and hydrogenation of styrenic monomer feedstock having a ring and ball softening point of about 10°–45° C., (ii) from about 2 to about 40 weight % of a triblock copolymer with a saturated elastomeric block in the center and a thermoplastic block on each end alone or in combination with a diblock copolymer of a hard thermoplastic block and a saturated, soft ethylene-propylene polymeric block, and (iii) up to about 80 weight % of a mineral oil.

DETAILED DESCRIPTION OF THE INVENTION

Discussion of the Prior Art

Pressure sensitive adhesives are typically thin films less than about one mil. Since they can be visualized as liquids coated on a backing, they are not as functional as an adhesive when they are made into a thick film. Thick film pressure sensitive adhesives have a thickness greater than about 1 mil, desirably greater than about 4 mils, more desirably greater than about 8 mils, preferably greater than about 12 mils, and most preferably, greater than about 20 mils. They have not found favor because they fail as a result of cohesive failure leaving a deposit of material on the surface from which they are removed.

There are few pressure sensitive adhesives that function as thick films and have the following advantages:
(1) They are solids.
(2) They are repeatedly reusable.
(3) They possess a soft tactility.
(4) They do not bond to hair.
(5) They span a wide variety of applications.

Kraton TM thermoplastic rubber polymers of the "G 1600 series" are a class of commercially available non-vulcanizable tri-block copolymers with a saturated elastomeric block in the center and a thermoplastic block on each end that is manufactured and sold by Shell Chemical Company, ("Shell") One Shell Plaza, Houston, Tex. 77002. They are characterized as ideally suited to the formulation of solvent-based adhesives, sealants and coatings.

This series of rubbers are characterized as possessing excellent resistance to degradation by oxygen, ozone and UV light. The copolymers are two-phase block copolymeric structures as evidenced by their two (2) $T_g$'s. Attack of either phase by solvents, heat, resin additives, oils, and the like materials, have a profound effect on the performance characteristics and utility of these copolymeric rubbers. Certain additives will attack the rubber phase of the copolymers and others will attack their thermoplastic phases. Many commercial resins and plasticizers are taught by Shell as useful in Kraton TM rubber formulations. In that context, Shell has characterized "Regalrez TM Series" as a "rubber phase associating resins" that can be used in Kraton TM rubber formulations. That characterization is as follows:

| Rubber phase associating resins | Softening point, °C. | Chemical base | Manufacturer |
| --- | --- | --- | --- |
| Regalrez TM Series | 17–125 | Hydrocarbon | Hercules |

A particularly preferred Kraton TM thermoplastic rubber from the standpoint of this invention is Kraton TM G-1651. It is a triblock polymer of an ethylene-1-butylene copolymer elastomer containing polystyrene end polymer groups. The properties of Kraton TM G 1651 are compared to the properties of Kraton TM G-1650, Kraton TM G-1652, Kraton TM GX-1657 and Kraton TM G-4609 in the following table:

TABLE 1

| Property | Kraton G-1650 (SEBS)[1] | Kraton G-1651 (SEBS) | Kraton G-1652 (SEBS) | Kraton GX-1657 (SEBS) | Kraton G-4609 (SEBS) |
| --- | --- | --- | --- | --- | --- |
| Tensile Strength, psi[2] | 5,000 | >3,000 | 4,500 | 3,400 | 3,000 |
| 300% Modulus, psi[3] | 800 | 700 | 700 | 350 | 200 |
| Elongation, %[4] | 500 | 650 | 500 | 750 | 1,100 |
| Set at Break. % | — | — | — | — | 20 |
| Hardness, Shore A | 75 | — | 75 | 65 | 37 |
| Specific Gravity | 0.91 | 0.92 | 0.91 | 0.90 | 0.90 |
| Viscosity[5] | 1,500 | 2,000 | 550 | 1,100 | 4,000 |
| Plasticizer Oil Content, % w | 0 | 0 | 0 | 0 | 47 |
| Styrene/Rubber Ratio | 28/72 | 33/67 | 29/71 | 14/86 | 33/67 |
| Physical Form | Crumb | Crumb | Crumb | Crumb | Crumb |

[1]Styrene-ethylene-butylene-styrene block copolymer
[2]ASTM method D412-tensile tester jaw separation speed 10 in./min. Typical properties determined on film cast from a toluene solution.
[3]See fn. 1 supra.
[4]See fn. 1 supra.
[5]Brookfield (toluene solution), cps at 77° F. (25° C.); neat polymer concentration, 20% w except for G-4609 which is at a plasticized polymer concentration, 25% w.

It had been indicated by Shell that Kraton TM G-1651 is the highest molecular weight rubber of those characterized in Table 1, supra, and the viscosity measurements in Table 1, supra, would tend to support that characterization.

Another series of the Kraton TM thermoplastic rubbers are the diblock polymers in which one block is a hard thermoplastic and the other is a saturated soft elastomer. Illustrative of this series is Kraton ™ G 1701, a diblock polymer of a hard polystyrene block and a saturated, soft poly(ethylene-propylene) block. It is described as compatible with Kraton ™ G 1652 and blends of the two polymers are lower in strength than Kraton ™ G 1652 alone. Typical properties of Kraton ™ G-1701 are as follows:

TABLE 2

| Tensile properties[6] | | |
|---|---|---|
| Tensile strength, psi (MPa) | 300 | (2.1) |
| Elongation at break, % | <100 | |
| Hardness, Shore A durometer | 81 | |
| Solution Viscosity[7] 15% w. in toluene, cps (Pa-s) | 1260 | (1.26) |
| Styrene/rubber ratio | 37/63 | |
| Physical Form | Crumb | |

[6]Measured on films cast from toluene, Instron jaw separation rate 10 inches per minute (250 mm per minute), temperature 25° C., dumbell specimens cut with ASTM die D.
[7]Measured at 25° C. using a Brookfield Model RVT viscometer with a number 21 spindle.

Regalrez ™ resins are manufactured and sold by Hercules Incorporated, Wilmington, Delaware. They are characterized as hydrogenated pure monomer resins. They are understood to be styrenic monomer derived, such as from styrene, alphamethyl styrene, vinyltoluene, and the like. Desirable Regalrez ™ resins from the standpoint of this invention are those which are liquid at room temperature (about 23° C.), having a low softening point, determined by the ring and ball method, and a second order transition temperature ($T_g$) below about 30° C., preferably below about 0° C. Typical properties of relevant Regalrez ™ resins are cited in the following table:

TABLE 3

| Regalrez ™ Resin | 1018 | 1033 | 1065 | 1078 |
|---|---|---|---|---|
| Ring & ball softening point, °C. | 18 | 32 | 65 | 76 |
| Glass Transition Temp., °C. | −22 | −9 | 16 | 26 |
| Specific Gravity | .942 | .943 | .948 | .948 |
| Melt Viscosity, °C. | | | | |
| @ 100 cps. | 90 | 105 | 160 | 165 |
| @ 1000 cps. | 55 | 75 | 120 | 135 |
| @ 10,000 cps. | 35 | 55 | 100 | 120 |
| Cloud Point, °C., in | | | | |
| Diacetone alcohol/xylene 1:1 | 14 | 32 | 33 | 38 |

TABLE 3-continued

| Regalrez ™ Resin | 1018 | 1033 | 1065 | 1078 |
|---|---|---|---|---|
| Methylcyclohexane/aniline 1:2 | 63 | 71 | 80 | 84 |
| Odorless mineral spirits | <−40 | <−40 | <−40 | <−40 |
| Molecular weight | | | | |
| $M_w$ | 407 | 493 | 723 | 819 |
| $M_n$ | 374 | 390 | 601 | 654 |
| $M_w/M_n$ | 1.09 | 1.27 | 1.20 | 1.25 |

As pointed out above, Regalrez ™ resins have been suggested for use in combination with Kraton ™ thermoplastic rubbers. In fact, the combination has been recommended for the manufacture of pressure sensitive adhesives. In each instance, the amount of the Kraton ™ rubber employed in the adhesive is a substantial portion of the adhesive formulation; in some instances, the amount of Kraton ™ rubber recommended is greater than or equal to the amount of any of the Regalrez ™ resins employed. Illustrative of prior art adhesive formulations are the following:

TABLE 4

| Formulation No. | A | B | C | D | E | F | G | H |
|---|---|---|---|---|---|---|---|---|
| Kraton F-1657 | 49.8 | 40.6 | 36.0 | 31.1 | 31.6 | 30.0 | 33.0 | 35.0 |
| Regalrez 1078 | 18.9 | 7.8 | — | 36.8 | — | 30.0 | — | 20.0 |
| Regalrez 1065 | — | 30.3 | 32.0 | — | 35.8 | — | 33.0 | — |
| Regalrez 1033 | 31.3 | 21.3 | 32.0 | 32.1 | 32.6 | 40.0 | 34.0 | — |
| Regalrez 1018 | — | — | — | — | — | — | — | 45.0 |
| Total % | 100 | 100 | 100 | 100 | 100 | 100 | 100 | 100 |
| Phys. Properties | | | | | | | | |
| Viscosity[8] | 110 | 50 | 30 | 23 | 18 | 14 | | |
| Softening Point[9] | 42 | 49 | 44 | 48 | 44 | 44 | 43.5 | |
| Calc. $T_g$, °C. | −31 | −23 | −23 | −17 | −18 | −18 | −18 | −27 |
| RDS $T_g$, °C. | −20 | −10 | −7 | 0 | 0 | 2 | | |
| Plateau Modulus, psi | 51 | 36 | 29 | 23 | 17 | 16 | | |
| Adhesive Properties | | | | | | | | |
| Rolling ball tack, cm. | 2.2 | 2.2 | 2.9 | 5.6 | 4.2 | 5.6 | | 2.2 |
| Polyken tack gm/cm² | 505 | 490 | 625 | 860 | 820 | 1205 | | 600 |
| 90° quick stick oz./in. | 9 | 5 | 18 | 13 | 46 | 59 | | |
| 180° peel adhesion oz./in. | 20 | 8 | 36 | 27 | 75 | 88 | | 24 |

[8]@ 350° F. (177° C.), 1,000 cps.
[9]Ring & ball, °C.

The above formulations and data suggest that the most effective adhesive is formulation F containing 30 weight % Kraton ™ G-1657. It employs a combination of Regalrez ™ 1078, the highest softening temperature and molecular weight of the resins characterized in Table 3 above, and 1033, the second lowest softening temperature and molecular weight of the resins characterized in Table 3 above. That formulation had better than two times the adhesive properties in respect to each of the properties commonly measured than formulations A, B and H, and close to that in respect to formulation C. Overall, it has vastly superior properties to the other formulations, namely D and E. Interestingly, it had the same rolling ball tack as formulation D, yet it is significantly superior as to the remaining properties measured. Thus, a common adhesive property fails to connote common overall adhesive properties. The deviations of the average of the molecular weights of the resins in these formulations to the base average molecular weight (100%) taken from the average molecular weight of the resin mixture of formulation number F, are as follows:

| Formulation No. | A | B | C | D | E | F | G | H |
|---|---|---|---|---|---|---|---|---|
| % of base molecular weight value | 97 | 103 | 96 | 105 | 97 | 100 | 96 | 84 |

Hercules originally introduced Regalrez TM 1065, 1078, 1033 and 1018 as RES-D-150, 151, 45 and 44, respectively. A "Development Data" sheet published by Hercules Incorporated set forth the pressure sensitive adhesive formulations and their performance properties. They are repeated in Table 5 below.

TABLE 5

| TYPICAL COMPOUNDS | A | B | C | D |
|---|---|---|---|---|
| Kraton GX-1657 | 35 | 40 | 30 | 30 |
| RES-D-150 | — | — | 35 | — |
| RES-D-151 | 45 | 42 | — | 40 |
| RES-D-44 | 20 | 18 | — | 30 |
| RES-D-45 | — | — | 35 | — |
| Tg of Compound, °C. | −17 | −20 | −15 | −17 |
| PERFORMANCE PROPERTIES | | | | |
| Polyken Tack, gms/cm$^2$ | 1020 | 820 | 1000 | 930 |
| Quick Stick, oz/lin. in. | 30 | 22 | 32 | 27 |
| Rolling Ball Tack, cm | 7 | 7 | 9 | 8 |
| 180° Peel, oz/lin. in. | 50 | 43 | 51 | 45 |
| 178° Hold to Steel, Min. @ 20° C., 1000 gm wt. | >5000 | >5000 | >5000 | >5000 |
| SAFT, ° C., 1000 gm wt., 1″ × 1″ | 80 | 92 | 80 | 75 |

Bulletin OR-218A of Hercules Incorporated, Wilmington, Delaware, comprises a reprint of an article by Curtis DeWalt, published in Adhesive Age, March, 1970, entitled: "Factors in Tackification." At page 2 of the bulletin, the first page of the article, DeWalt states- "If we think of a tackifying resin as a solvent for the rubber—a solid solvent—we have the first step to a description of how a resin may tackify a rubber, that is, by bringing out the smaller, tack-bestowing molecules from their burial in the mass of the rubber.

"Dr. Frank Wetzel of Hercules has provided an additional fact. He has shown a submicroscopic heterogeneity that appears to coincide with maximum tackiness. This, Dr. Wetzel described as showing the existence of two phases: At maximum tack—maximum heterogeneity as the rubber-to resin ratio is changed. His electron micrographs (FIG. 1) show natural rubber a homogeneous mass (upper left); small particles of a second phase at 25 percent resin (upper right); and the heterogeneity building to near equal amounts of two phases at 50 and 60 percent resin (left and right center) with particle diameters of about 1 micron. *Then at 83 and 90 percent resin (lower left and right) there is an approach to homogeneity again.*" (emphasis supplied)

The caption to FIG. 1 of the article reads as follows:

"Electonmicrographs of replicas of pressure-sensitive adhesive films of 'Pentalyn' H (Pentaerythritol ester of hydrogenated rosin)-natural rubber. (Mag. 11,000X)(133,149)
 (a) Natural rubber, tack value-200 to 300
 (b) 1:3 Pentalyn H-rubber, tack value-320
 (c) 1:1 Pentalyn H-rubber, tack value-590
 (d) 3:2 Pentalyn H-rubber, tack value-1,100 to 1,200
 (e) 5:1 Pentalyn H-rubber, *tack value*-0
 (e) 9:1 Pentalyn H-rubber, *tack value*-0" (emphasis supplied)

DeWalt, at page 5 of the bulletin (page 4 of the article) makes the following comments regarding the molecular weight of the resin additive:

"Concerning the molecular weights of resins, usually the smaller the molecule, the higher the solvency power—as with monomeric solvents.

"While low molecular weight in a resin is desirable, there is a practical limit to this. A resin becomes a liquid as its molecular size is reduced, and almost any resin will act as a tackifier if its softening point is low enough. *But adhesives made with soft resins lack in cohesive strength.*" (emphasis supplied)

It would appear from this art that desirable adhesives employ low molecular weight resins in limited amounts, certainly below about 80 weight percent of the weight of the adhesive formulation.

Chmiel et al., U.S. Pat. No. 4,501,842, patented Feb. 26, 1985, describe an adhesive for bonding cured EPDM membranes comprising, inter alia, a halogenated butyl rubber, a pre-crosslinked butyl rubber, Kraton TM G-1652, Piccovar TM AB180, [10] and an aliphatic isocyanate.

[10]. Sold by Hercules, Inc., supra. A low molecular weight high softening point, thermoplastic, aliphatic type hydrocarbon based resin made from petroleum monomers. Softening point of 175°–181° C., acid no. <1, Br no. of 16.0–20.0 at a concentration of 120.0–160.0 parts per 100 rubber.

Albers, U.S. Pat. No. 4,609,697, patented Sept. 2, 1986, describes a hot melt adhesive comprising a Kraton TM G rubber having a styrene to olefin ratio of about 30:70 (the specific one is not mentioned), an aliphatic hydrocarbon resin, an aromatic hydrocarbon resin, and, as an optional ingredient, a bitumen material.

Duvdevani, U.S. Pat. No. 4,313,867, patented Feb. 2, 1982, describes an injection moldable elastomeric composition which contains a Kraton TM G series rubber, a specific neutralized sulfonated EPDM terpolymer, an isotactic polypropylene homopolymer, and a non-polar backbone process oil.

SUMMARY OF THE INVENTION

This invention relates to thick gel appearing pressure sensitive adhesives films of at least 1 mil in thickness that release from a surface by adhesive failure, not cohesive failure, and which can be repeatedly used and reused. They are tacky to the touch and cleanly peel from the skin yet retain exceptional adhesive qualities to a wide variety of materials. Certain of the adhesives are distinquished for their ability to bond difficult to bond surfaces as polyethylene, polypropylene and fluorinated hydrocarbon plastics. Others have a soft feel which make them eminently suitable for skin applications.

The adhesives of the invention are films of at least 1 mil thick and comprise an essentially homogeneous mixture containing, based on 100% of the solids weight of the adhesive, (i) at least 20 weight % of a low molecular weight resin produced by the polymerization and hydrogenation of styrenic monomer feedstock having a ring and ball softening point of about 10°–45° C., (ii) from about 2 to about 40 weight % of a triblock copolymer with a saturated elastomeric block in the center and a thermoplastic block on each end alone or in combination with a diblock copolymer of a hard thermoplastic block and a saturated, soft ethylene-propylene polymeric block, and (iii) up to about 80 weight % of a mineral oil.

DETAILS OF THE INVENTION

The invention involves thick pressure sensitive adhesive films which comprise, more desirably consist essentially of, a pressure sensitive adhesive composition containing as primary ingredients, inter alia, a relatively minor amount of a triblock copolymeric rubber having an inherently higher molecular weight, as reflected by its higher solution viscosity, and a large amount of a relatively low viscosity tackifying resin. Optional ingredients include a very low strength diblock polymer and mineral oil. The exact composition of the adhesive is dictated by the adhesive applications contemplated.

The invention is directed to relatively thick pressure sensitive adhesive films which, if desired, can be generated on a substrate as one would apply a contact adhesive, such as from a solution, to create a film thereon. The adhesives compositions for making the films can be formed into a solvent-free hot melt processable material that can be secured to a wide variety of substrates to generate the thick film structure.

The adhesive films of the invention span a wide variety of uses and a wide variety of forms of application. The adhesive films can be designed to possess selective adhesion depending on the adherend surface on which it is created and the ultimate surface(s) to which it is to be adhesively bonded. For example, the adhesive film can be designed to be a fashion adhesive in that the adhesive composition can be stuck to a variety of fashion items which in turn can be adhered to skin, hair, nails, fabrics (e.g., textiles, leathers and plastics), metal, non-fabric plastics, paper (including wallpaper and gypsum board) and paint. However, once applied as an adhesive film, the adhesive retains reshapeability and can be reused repeatedly by converting it to a thick film and reapplying the film to the desired surface for the adhesive application. This means that a film of the adhesive can be separated from the adhering surfaces and reshaped to a wide variety of shapes such as into a ball, then reshaped again as a film and used again as a pressure sensitive adhesive for the same materials or other materials while in that form. It can even be applied as a ball to a surface, and with pressure be flattened into a film to effect the desired adhesion.

The thick film pressure sensitive adhesives of the invention have a thickness greater than about 1 mil, desirably greater than about 4 mils, more desirably greater than about 8 mils, preferably greater than about 12 mils, and most preferably, greater than about 20 mils.

The pressure sensitive adhesive films of the invention function as thick films and have the following advantages:
(1) They are solids.
(2) They are repeatedly reusable.
(3) They can be made to possess a soft tactility.
(4) They do not bond to hair.
(5) They span a wide variety of useful applications.
(6) They are stable materials.

Utilities

The adhesive films of the invention can be made to fit a diverse family of adhesive applications. The following illustrates a number of them.

Table of Utilities

Solvent borne fashion adhesive films
Hot melt coated films on decorative objects
Pin-free adhesive board
High strength adhesive for difficult to bond surfaces
Facemask and hairpiece pressure sensitive adhesive
Small appliance and instrument holder
Compression load adhesive
Resealable adhesive film for closure and pneumatic membranes

Solvent Borne Fashion Adhesives

In one embodiment, the pressure sensitive adhesive film of the invention is particularly useful as a fashion adhesive to bond decorative or stage materials to the skin or hair. It can be used to adhere decorative pictures, designs or labels to the skin or hair as a "fashion statement" and be removed without leaving an adhesive deposit on the skin or hair, as the case may be. The adhesive can be applied first to the hair or skin to generate the desired thick film, and them a decorative object such as spangles (sequins) can be arranged on top of the adhesive to suit ones taste. In the preferred embodiment of this application, the adhesive film is first formed on the decorative piece by coating a solvent solution of the adhesive composition onto the decorative piece and then the piece is subjected to a drying step, typically for a period of hours, such as overnight. The object or piece is then applied to the skin or other surface used for effecting the fashion effect.

The adhesive films of the invention, in general, are particularly desirable in applications where the item to be bonded to the adherend is to be repeatedly removed and reapplied, up to 20 or more times. The pressure sensitive adhesive film of this embodiment of the invention finds its most creative utility as a theatrical adhesive film, particularly as a replacement for spirit gum. It can be used to bond makeup items and hairpieces to the skin or hair. For example, it may be used to bond a false hairpiece over the hair or scalp without generating an adhesive film residue when the hairpiece is removed.

In this embodiment, the pressure sensitive adhesive film of the invention provides the following advantages:
  It can be removed from the skin without inducing skin trauma.
  It can be pulled free from hair without inducing painful pulling.
  It does not leave residues on skin or hair.
  It is water insoluble and therefore, it is unaffected by sweat.
  It is compatible with many oils and therefore, it is unaffected by oils in the hair or skin, and many of the oils applied to the skin or hair.
  It behaves as a solid yet is soft enough to flow and conform to a surface like a liquid (or recover from deformation).

Hot Melt Coated Films On Decorative Objects

The adhesive film formulations used in the invention are particularly applicable to hot melt processing. Since all of the primary ingredients used in formulating the adhesive are solution compatible, they can be combined above the melting point of the triblock polymer component to form a solution free of solvent. They can also be combined with the aid of a solvent at lower temperatures and the solvent is evaporated to produces a composition that can be melted and applied to a surface as a hot melt coating which on cooling produces the pressure sensitive film of the invention. This is a convenient method for generating the adhesive films of the invention on any number of a variety of surfaces, including skin, masks, hairpieces, and the like. In larger scale operations where a plurality of objects are produced, this is a favored technique.

Pin-free Adhesive Board

In another embodiment of the invention, the pressure sensitive adhesive film of the invention is extremely desirable as a "low load level" pressure sensitive adhesive film. A low load level adhesive film, as used herein, means an adhesive film that can adhere and support, when vertically bonded thereto, low levels of weight but which suffer adhesive (as contrasted with cohesive) failure at high (or higher) levels of weight. Illustrative of an very low load level pressure sensitive adhesive film is that used with the product called "Post-it TM."[11] On the whole, the pressure sensitive adhesive films of the invention exhibit superior adhesive properties and therefore can be employed to adhesively bond relatively heavier objects to the adherend. This aspect of the invention envisions the adhesive film for pressure sensitive applications where the adhesive film is supplied to a load bearing surface which is capable of supporting the object to be bonded. The adhesive film of the invention is capable of supporting a significant load up to a pull strength almost equal to the cohesive failure of the adhesive film yet the adhesive film will distinquish itself by clean adhesive failure at the interface of the adhesive film and the load. An advantage of the invention is that the adhesive film can be formulated for a variety of applications such that its adhesive properties can be optimized for the desired application.

11. Made and sold by 3M Company, St. Paul, Minnesota.

The low load bearing qualities of adhesive films of the invention make them excellent adhesive films for pin-free adhesive boards. They can be cast as thick pressure sensitive adhesive films (ranging from about 1 mil to about 100 mils) on the adherend (wood, plastic, composite, plasterboard, including gypsum board and other dry wall construction, glass, paint, and the like) and the combination can be part of a wall, suspended from a wall, appliance, ceiling, and the like, and used as a bulletin board to hold a wide variety of objects such as paper, books, pencils, eating utensils, art objects, and the like.

The pin-free boards of the invention comprise, inter alia, a supporting adherend to which the adhesive film is bonded. The adherend may be of any shape or size capable of receiving the adherent pressure sensitive adhesive film of the invention. A simple laminate construction is all that is required to satisfy the board construction of the invention. The laminate may be a composite of only two layers. If desired, the adherend may be of any complex shape or construction without departing from this invention.

High Strength Adhesive For Difficult To Bond Surfaces

Certain formulations of the adhesive films of the invention constitute general repair adhesives that can be employed for a wide variety of applications. They can function, if needed, like a contact cement in that the adhesive composition can be applied to one or both of the adhering surfaces to form the film or films thereon, and when the adhesive film is thoroughly dry, the intended surfaces are brought together such that the adhesive film acts as an interface between them. These general repair adhesive films can be used to join any combination of metal, wood and plastic surfaces. They are effective for bonding a surface or surfaces made of polyethylene, polypropylene and fluorinated hydrocarbon plastics such as polytetrafluoroethylene or polyfluorochloroethylene, viz., Teflon TM. Experimental work suggests that the general repair adhesive films of the invention are particularly effective in bonding lap joints. The general repair adhesive films are most desirable in the repair of water tanks and fittings used for agriculture and solar heating. In this category of utility, the range of modes of using the adhesive films of the invention are quite numerous.

Facemask and Hairpiece Pressure Sensitive Films

As pointed out previously, the adhesive films can be made to possess a soft feel. The tactile quality makes the adhesive films of the invention eminently suitable for use to secure facemasks and hairpieces to skin or hair. What is especially endearing about the adhesive films of the invention are the following:

The films are thick and consequently they are easily positioned over the face or scalp or hair.

The films feel soft on and gentle to the skin, and thus can be worn easily.

The soft films are extremely tacky and securely attach to skin or hair.

As pointed out previously, the films can be removed from skin without inducing skin trauma. They can also be removed from skin and hair without causing physical pain.

When pulled from skin or hair, the film leaves no residues on skin or hair, thus no residue has to be removed from the skin or hair.

The adhesive films are water insoluble and therefore are unaffected by sweat and because they are compatible with a variety of oils, they are unaffected by skin oils or oils typically added to hair or skin.

Small Appliance and Instrument Holder

The thick pressure sensitive adhesives of the invention can be used to hold valuable small appliances and instruments. Because of their tackiness, they can be used to keep the object from moving in transit. Because the film is soft, they can be used, as well, as cushioning to protect the item in transit from shock. One technique for using the thick film pressure sensitive adhesives of the invention is to apply a layer of the film to a batting as the adherend, and wrap the object being protected in contact with the film or the batting, depending on the object of protection desired. If the batting contacts the object, then the adhesive film can be used to secure the wrapped object to the container so that the object is not movable therein. In this manner, one can customize the protection afforded the object.

The thick pressure sensitive adhesive film can be used as a pad on tables where expensive and/or delicate objects are held. A layer of the adhesive makes a very desirable jewelers surface for holding precious stones and fine jewelry. It can make a fine work surface for holding small and delicate parts, such as are involved in watch repairing and in making electronics equipment. Since the adhesive films can be colored by adding colorants to the formulation, colored films which assist in the visual aspects of the use of the work surface can be easily generated.

Compression Load Adhesives

There are many solid objects that one seeks to temporarily bond to a surface and not have the object injured or moved, or the surface marred. Dishes, trays, sculpture, bowls, glass plates, and the like, can be protected by the adhesive films of this invention. Particularly useful for this application is a composite of the adhesive films of this invention. In this embodiment, one adhesive film may be made to contain mineral oil and that can be bonded to another film which is free of mineral oil. If the surface to which the composite is to be used on is made with a finish or coating that the oil attacks, then the oil free adhesive portion or layer is applied to that surface. However, if both the object and the surface to which it is to be bonded are attackable by the mineral oil in the adhesive films, then the films can be made free of the mineral oil.

The adhesive film can be made quite thick, as thick as an inch or more. Indeed, they may be used as plugs. In such state, the adhesive films of the invention may be used to resist compression and absorb shock imposed on it or the item to which it is secured or of which it forms a part. For example, the adhesive film formulation may be poured into the interior of a pneumatic tire to act as a resealing film when the outer tire layer is punctured. Because the adhesive film of the invention can be made to be a flowable tacky mass, when the tire membrane is punctured the film acts to repair itself by flowing over the incision made in it. This self healing quality is prevalent in essentially all of the adhesive film formulations of the invention. Such resealability is an adjunct to the compression absorbing qualities of the adhesive film in that application.

Resealable Adhesive Films for Closure and Pneumatic Membranes

As pointed out above, the adhesive films of the invention have the capacity of resealing the pneumatic chambers of a tire to retain air therein when the tire is punctured. This same quality is extremely desirable for retaining fluids in containers, whether the fluid is liquid or gas. The advantage of the films of this invention for such application is that the film, in the environment of the use will not leave deposits or residues of itself on the instrument puncturing the membrane and the adhesive film. The adhesive of the invention is particularly desirable as a resealing film in multi-dose vials where the inertness and stability of the film's components are admirably suitable for employment with many medicines and materials without adverse impact.

This property of the adhesive films of the invention can be enjoyed by simply coating, via hot melt techniques or solution coating (e.g., solvent based coatings or melt extrusion), the film formulation onto the surface to be resealed. A thin layer of the adhesive will suffice to effect resealing. The film should be at least 1 mil thick, and may be as thick as twenty-five (25) mils or more.

The resealing qualities of the pressure sensitive adhesive of this invention can be combined with the compression load absorbtion and/or the shock absorbtion properties to good effect. The adhesive films can be supplied to joints that retain fluids and/or absorb compression or shock, and the joint in use is benefitted by the properties of the film.

Formulation Considerations

Pressure sensitive adhesive films of the invention can be made by solution blending A. from about 2 to about 40 weight %, on a solids basis, of the weight of the blend, of a triblock copolymer with a saturated elastomeric block in the center and a thermoplastic block on each end, alone or in combination with a diblock copolymer of a hard thermoplastic block and a saturated, soft ethylene-propylene polymeric block;

B. at least 20 weight %, on a solids basis, of a low molecular resin produced by the polymerization and hydrogenation of styrenic monomer feedstock having a ring and ball softening point of about 10°–45° C.; and C. up to about 80 weight % of a mineral oil having a viscosity of about 200 to about 1,200 Saybolt Universal Seconds, determined at 100° F. (38° C.).

The solution may be effected by solution blending in a suitable solvent or by melt blending the ingredients in a suitable blending device.

The triblock copolymers suitable for use in the practice of the invention comprise a soft saturated olefinically derived inner core polymer or oligomer block bonded at each end by hard polymeric or oligomeric blocks. The latter blocks are derived from polymerized olefin monomers, typically generating a block which possesses a high glass transition temperature ($T_g$) relative to the core polymer or oligomer. The Kraton TM polymers exemplify such triblock copolymers. Particularly desirable triblock copolymers suitable for the practice of this invention are the "SEBS copolymers," that is, the styrene-ethylene-butylene-styrene block copolymers, embodied by the Kraton TM G series described above. The preferred SEBS copolymers are those having essentially the characteristics and properties of Kraton TM G-1651. A particularly desirable SEBS copolymer for the adhesive films of the invention have a styrene polymer or oligomer block to ethylene-butylene rubber block weight ratio of about 0.35 to about .60, preferably about 0.45 to about 0.55, and most preferably, about 0.48 to about 0.52. The particularly desirable SEBS copolymer is soluble in toluene, ethylene trichloride (1,1,1-trichloroethane) or dipentene and exhibits a viscosity greater than about 1,600 centipoises at 25° C., preferably about 2,000 centipoises at 25° C., measured in a 20 weight % toluene solution on a Brookfield viscometer.

Kraton TM G-1651 is a higher molecular weight triblock copolymer than the other members of the Kraton TM G series. This difference is regarded to be an important factor in the performance of Kraton TM G-1651 in the adhesive film compositions of this invention. The other Kraton TM rubbers of the G series, see Table 1 above, do not per se provide the same benefits as Kraton TM G-1651 in the adhesive film compositions of the invention.

The amount of Kraton TM G-1651 employed in the formulation is dependent upon the application to which the adhesive film is put. If the adhesive film is intended for the fashion, novelty and theatrical areas, then it is desirable to limit the amount of the G-1651 to about 2 to about 10 weight percent of the adhesive film, on a solids basis. In such applications, the amount of the resin component should be at least about 75 weight percent, on a solids basis, of the adhesive film formulation. When the adhesive film is employed for repair applications, the G-1651 may be present up to about 40 weight percent of the formulation, taken on a solids basis. A higher amount of the G-1651 is desirable where the adhesive film is employed as higher load pressure sensitive that allows it to be employed for applications which bonds heavier materials which can be released from the adhesive film without cohesive failure of the adhesive film layer.

Usually, the G-1651 is the only rubber component of the adhesive film formulation. In the fashion adhesive film application, where the rubber content is low (viz. about 2-15 wt. %), one may substitute Kraton TM G-1701 for part of the G-1651 to make the adhesive film softer and more flowable under the pressure employed when enjoying it as an adhesive film. The general rule is for each 1 weight % of G-1651, one may replace it with about 2 weight % of G-1701. Even so, one should always employ some G-1651 in the formulation, desirably at least about 2 weight %, all on a solids basis.

The most significant component of the adhesive film composition of the invention, on a solids weight basis, is the low molecular resin produced by the polymerization and hydrogenation of a styrenic monomer feedstock, having a ring and ball softening point of about 10°-45° C., preferably a ring and ball softening point of about 14°-25° C. and a low weight average molecular weight below about 550, typically below about 500, and usually above about 330. The resins are desirably liquids at room temperature, about 23° C. The resins fulfilling these qualifications are commercially available as Regalrez TM 1018 and 1033. Details of their compositions and physical properties are set forth above. They can be used alone or in combination. The preferred resin is Regalrez TM 1018. The preferred resin has a weight average molecular weight between about 375 and 430. For example, a smaller amount of Regalrez TM 1033, up to about 40 weight % of the resin composition, on a solids basis, can be incorporated into the adhesive film formulation. An exceptional feature of the invention is the uniquely high concentration in the adhesive film composition of the invention of these low molecular weight resins. This is a typical of the teachings in the art.[12] See Tables 4 and 5, supra.

[12]. Regalrez TM 1018 and Regalrez TM 1033 were originally introduced as RES-D-44 and RES-D-45, respectively. The Hercules Incorporated "Development Data" sheet introducing them characterized their designed function "as one component of a two part tackifier system for highly-stable, saturated block copolymers." Under a section entitled "SUGGESTED USES," the following was stated:

"Resins RES-D44 and RES-D-45 should be considered for use as one component (combined with RES-D-150 and/or RES-D-151) of a two part tackifier system for highly-stable, saturated block copolymers. Pressure Sensitive Adhesive formulations have been developed which approximate the performance of styrene-isoprene-styrene-based adhesives for labels, decals and transparent tapes. These formulations exhibit superior tack, adhesion, and cohesive strength in comparison with a commercial acrylic tape."

A third ingredient of the adhesive film composition is optional depending on the intended application of the adhesive film. There may be provided in the adhesive film composition used as a pressure sensitive adhesive film, up to about 80 weight % thereof of a mineral oil having a viscosity of about 200 to about 1,200 Saybolt Universal seconds, determined at 100° F. (38° C.). The mineral oils may be derived from napthenic or paraffinic feed sources. Each type of contributes to the performance of the adhesive film. Mineral oils of a paraffinic origin provide low odor and color and mineral oils of a napthenic origin lend high viscosity and superior tack properties. The viscosity of the mineral oil is not narrowly critical to the invention. Overall, the mineral oil serves to slightly reduce the tack of the pressure sensitive adhesive film composition and also makes the adhesive film softer (e.g. more compressible). The amount of the mineral oil that is employed in the practice of the invention is not narrowly critical and is dictated by the use to which the adhesive film is put. A fashion adhesive film can contain various amounts of mineral oil. If the fashion adhesive film requires less tack, then more mineral oil should be added. However, mineral oils are desirably excluded from the general repair adhesive film compositions or used in them in very small amounts, typically less than about 5 weight percent of the weight of the adhesive film, based on 100% of the solids weight of the adhesive film.

The amount of the mineral oil that is employed, in the case of the fashion adhesive film, will typically be less than about 30 weight percent of the weight of the adhesive film, based on 100% of the solids weight of the adhesive film. In that preferred embodiment, the mineral oil will be less than about 20 weight %, the same basis. In the preferred embodiment of a fashion adhesive film, there is employed at least about 2 weight % of the mineral oil.

In the typical case, the amount of the mineral oil in the adhesive film of the invention, is kept below about 70 weight percent, more desirably below about 60 weight percent. Manufacture of the adhesive film formulation is not narrowly critical. The adhesive film can be made by use of a common solvent for the solids components of the formulation. Suitable solvents are those commonly employed for both the rubber and resin components of the adhesive film and which provide the desired volatility for the adhesive film application. Illustrative of such solvents are the halohydrocarbons such as 1,1,1-trichloroethane, methylenechloride, and the like, terpenes such as dipentene, aromatic hydrocarbons such as toluene and xylene, and the like. The solids content of the solvent containing adhesive film may range from about 20 to about 80 weight percent of the weight of the solvent containing adhesive film formulation. A desirable consistency is generally obtain at a solids content of about 50 weight percent.

The solvent containing formulation is usually made by mixing the components in a convenient tank and effecting admixture with a conventional mixer, such as a paddle or Cowles TM Dissolver. The order of addition of the ingredients is not normally critical but it is preferred to add the lower viscosity material first followed by the solid materials that require solubilization. Mixing can be effected throughout or at the end of the additions.

Mixing is normally effected at room temperature, about 23° C. The rate of solubilization is enhanced by raising the solution temperature.

One may prefer to effect the blending by melt blending in the absence of a solvent. This is more readily effected in the case of this invention because the resin is liquid and as such contributes to the solubilization of the rubber. According to technical literature of Shell on "melt processing with Kraton rubber" the "molten resins used in effect, become solvents for the polymer." The molten resin associates with the polystyrene of the G-1651, acting as a solvent for the phase during mixing and accelerate polymer dissolution. Mixing can be effected, in a batch operation, is a Cowles Dissolver, or, in a continuous operation, in a twin screw extruder such as are obtainable from Welding Engineers, King of Prussia, Pa. 19406, and Werner & Pfeiderer Corp., Waldick, N.J. 07463. Other mixing devices are employable for melt mixing of the adhesive film formulation. The general procedure for effecting such mixing is well understood in the art.

EXAMPLES

Example 1

The following formulations are prepared mixing equal parts by weight of a solvent, either dipentene or 1,1,1-trichloroethane, with the indicated materials in the weight percent proportions cited, in a Cowles Dissolver:

| FORMULATION NO. | 1 | 2 | 3 |
|---|---|---|---|
| Kraton G-1651 | 5% | 4% | 3% |
| Kraton G-1701 | 0% | 2% | 4% |
| Mineral Oil[13] | 9% | 9% | 9% |
| Regalrez 1018 | 86% | 85% | 84% |

[13]Arcoprime TM 400-, see table below.

The above formulations were cast in aluminum trays and dried in an oven to form thick adhesive films. Formulation no. 3 is a softer adhesive film than nos. 1 and 2. All are excellent fashion adhesive films. They each can be applied to a variety of surfaces and after the solvent is allowed to evaporate from the film overnight, the resulting 100% solids film can be effectively applied as a pressure sensitive adhesive film to skin and removed without leaving deposits of the adhesive film behind on the skin or causing pain to the user.

Example 2-196

The following examples 2-196 were made according to the procedure of Example 1. In the following examples, Kraton G-1651 was used as a 5 weight solution in 1,1,1-trichloroethane, Kraton G-1701 was used as a 10 weight solution in 1,1,1-trichloroethane, Regalrez 1018 was used as a 50 weight solution in 1,1,1-trichloroethane, and the mineral oils listed in the following table were used neat, i.e., as is. The solutions generated in each example were poured into small aluminum trays and heated in an oven until dry. Each example formed a relatively thick film that is characterized below, after the tabular description of the concentrations and selections of ingredients.

TABLE

| | Data on Mineral Oils | | |
|---|---|---|---|
| Brand Name | Type | Viscosity Saybolt Universal Seconds @ 100° F. | Viscosity Saybolt Universal Seconds @ 210° F. |
| Arcoprime 70 | Paraffinic | 70 | 36.8 |
| Arcoprime 200 | Paraffinic | 190 | 46.0 |
| Arcoprime 300 | Paraffinic | 310 | 53.0 |
| Arcoprime 400 | Paraffinic | 408 | 59.0 |
| Gascon 9 | Naphthenic | 58 | 34 |
| Gascon 58 | Naphthenic | 306 | 48 |
| Gascon 100 | Naphthenic | 535 | 55 |
| Gascon 150 | Naphthenic | 813 | 63 |
| Gascon 220 | Naphthenic | 1203 | 74 |

The Arcoprimes are products made and sold by Atlantic Ritchfield Company, Philadelphia, Pa. and the Gascons made and sold by Lyondell Petrochemical Company, a division of Atlantic Ritchfield Company, Philadelphia, Pa.

| | Weight Percent of | | | |
|---|---|---|---|---|
| Example No. | Kraton G-1651 | Kraton G-1701 | Regalrez 1018 | Mineral Oil |
| 2 | — | — | 100 | — |
| 3 | 1.00 | — | 99.00 | — |
| 4 | 2.00 | — | 98.00 | — |
| 5 | 3.00 | — | 97.00 | — |
| 6 | 4.06 | — | 95.94 | — |
| 7 | 5.00 | — | 95.00 | — |
| 8 | 7.67 | — | 92.33 | — |
| 9 | 9.87 | — | 90.13 | — |
| 10 | 12.53 | — | 87.47 | — |
| 11 | 14.91 | — | 85.09 | — |
| 12 | 17.98 | — | 82.02 | — |
| 13 | 20.15 | — | 79.85 | — |
| 14 | 24.84 | — | 75.16 | — |
| 15 | 29.56 | — | 70.44 | — |
| 16 | 40.00 | — | 60.00 | — |
| 17 | 50.00 | — | 50.00% | — |
| 18 | 58.97 | — | 41.03 | — |
| 19 | 69.65 | — | 30.35 | — |
| 20 | 78.43 | — | 21.57 | — |
| 21 | 90.24 | — | 9.76 | — |
| 22 | 100.00 | — | — | — |
| 23 | — | 5.00 | 95.00 | — |
| 24 | — | 10.00 | 90.00 | — |
| 25 | — | 19.93 | 80.07 | — |
| 26 | — | 50.00 | 50.00 | — |
| 27 | 1.04 | 2.10 | 96.87 | — |
| 28 | 2.19 | 4.33 | 93.47 | — |
| 29 | 2.98 | 4.35 | 92.67 | — |
| 30 | 3.94 | 4.14 | 91.92 | — |
| 31 | 5.08 | 5.16 | 89.76 | — |
| 32 | 4.99 | 10.18 | 84.82 | — |
| 33 | 5.01 | 19.40 | 75.59 | — |
| 34 | 9.87 | 19.88 | 70.25 | — |
| 35 | 5.00 | — | 85.00 | Arcoprime 70 10.00 |
| 36 | 4.99 | — | 85.01 | Arcoprime 200 10.00 |
| 37 | 4.97 | — | 84.57 | Arcoprime 300 10.46 |
| 38 | 4.99 | — | 85.10 | Arcoprime 400 9.91 |
| 39 | 5.00 | — | 85.00 | Gascon 9 10.00 |
| 40 | 4.99 | — | 85.10 | Gascon 58 9.91 |
| 41 | 5.02 | — | 85.43 | Gascon 100 9.56 |
| 42 | 4.98 | — | 84.78 | Gascon 150 10.24 |
| 43 | 4.98 | — | 84.83 | Gascon 220 10.19 |
| 44 | 5.08 | — | 76.15 | Arcoprime 70 18.77 |
| 45 | 5.02 | — | 75.21 | Arcoprime 200 19.77 |
| 46 | 5.00 | — | 74.88 | Arcoprime 300 20.12 |
| 47 | 4.99 | — | 74.69 | Arcoprime 400 20.31 |
| 48 | 5.01 | — | 74.94 | Gascon 9 20.05 |
| 49 | 5.01 | — | 74.99 | Gascon 58 20.00 |
| 50 | 5.00 | — | 74.93 | Gascon 100 20.06 |
| 51 | 5.02 | — | 75.28 | Gascon 150 19.69 |
| 52 | 5.01 | — | 75.03 | Gascon 220 19.96 |
| 53 | 5.00 | — | 65.11 | Arcoprime 70 29.88 |
| 54 | 5.01 | — | 64.96 | Arcoprime 200 30.04 |
| 55 | 5.01 | — | 64.99 | Arcoprime 300 30.00 |
| 56 | 4.99 | — | 64.87 | Arcoprime 400 30.13 |
| 57 | 5.02 | — | 65.12 | Gascon 9 |

-continued

| Example No. | Kraton G-1651 | Kraton G-1701 | Regalrez 1018 | Mineral Oil |
|---|---|---|---|---|
| 58 | 5.04 | — | 65.57 | 29.86 Gascon 58 |
| 59 | 4.97 | — | 64.38 | 29.39 Gascon 100 |
| 60 | 5.00 | — | 64.62 | 30.65 Gascon 150 |
| 61 | 4.91 | — | 65.08 | 30.38 Gascon 220 |
| 62 | 5.02 | — | 55.10 | 30.02 Arcoprime 70 |
| 63 | 5.00 | — | 54.89 | 39.88 Arcoprime 200 |
| 64 | 5.02 | — | 55.14 | 40.11 Arcoprime 300 |
| 65 | 5.00 | — | 54.92 | 39.84 Arcoprime 400 |
| 66 | 5.02 | — | 55.17 | 40.07 Gascon 9 |
| 67 | 4.99 | — | 54.76 | 39.81 Gascon 58 |
| 68 | 4.97 | — | 54.59 | 40.26 Gascon 100 |
| 69 | 4.97 | — | 54.54 | 40.43 Gascon 150 |
| 70 | 4.99 | — | 54.81 | 40.49 Gascon 220 |
| 71 | 5.04 | — | 44.82 | 40.19 Arcoprime 70 |
| 72 | 5.04 | — | 44.82 | 50.13 Arcoprime 200 |
| 73 | 5.02 | — | 44.66 | 50.13 Arcoprime 300 |
| 74 | 5.06 | — | 44.97 | 50.32 Arcoprime 400 |
| 75 | 5.05 | — | 44.85 | 49.97 Gascon 9 |
| 76 | 5.02 | — | 44.58 | 50.10 Gascon 58 |
| 77 | 5.03 | — | 44.68 | 50.41 Gascon 100 |
| 78 | 5.03 | — | 44.71 | 50.29 Gascon 150 |
| 79 | 5.00 | — | 44.46 | 50.26 Gascon 220 |
| 80 | 5.00 | — | 35.09 | 50.54 Arcoprime 70 |
| 81 | 5.07 | — | 35.54 | 59.91 Arcoprime 200 |
| 82 | 4.99 | — | 34.96 | 59.39 Arcoprime 300 |
| 83 | 4.99 | — | 35.02 | 60.05 Arcoprime 400 |
| 84 | 4.99 | — | 34.99 | 59.98 Gascon 9 |
| 85 | 5.81 | — | 40.72 | 60.02 Gascon 58 |
| 86 | 5.01 | — | 35.15 | 53.47 Gascon 100 |
| 87 | 5.00 | — | 35.09 | 59.84 Gascon 150 |
| 88 | 5.01 | — | 35.15 | 59.91 Gascon 220 |
| 89 | 5.00 | — | 25.00 | 59.84 Arcoprime 70 |
| 90 | 5.00 | — | 25.00 | 70.00 Arcoprime 200 |
| 91 | 5.02 | — | 25.08 | 70.00 Acoprime 300 |
| 92 | 5.06 | — | 25.29 | 69.90 Arcoprime 400 |
| 93 | 5.07 | — | 25.34 | 69.65 Gascon 9 |
| 94 | 4.99 | — | 24.97 | 69.59 Gascon 58 |
| 95 | 5.01 | — | 25.06 | 70.04 Gascon 100 |
| 96 | 5.02 | — | 25.11 | 69.93 Gascon 150 |
| 97 | 5.00 | — | 25.00 | 69.86 Gascon 220 |
| 98 | 5.07 | — | 15.26 | 70.00 Arcoprime 70 |
| 99 | 5.07 | — | 15.26 | 79.67 Arcoprime 200 |
| 100 | 5.06 | — | 15.21 | 79.67 Arcoprime 300 |
| 101 | 5.52 | — | 16.61 | 79.73 Arcoprime 400 |
| 102 | 4.99 | — | 15.03 | 77.87 Gascon 9 |
| 103 | 5.08 | — | 15.30 | 79.98 Gascon 58 |
| 104 | 5.03 | — | 15.12 | 79.62 Gascon 100 |
| 105 | 4.99 | — | 15.03 | 79.85 Gascon 150 |
| 106 | 4.99 | — | 15.03 | 79.98 Gascon 220 |
| 107 | 5.00 | — | — | 79.98 Arcoprime 70 |
| 108 | 5.00 | — | — | 95.00 Arcoprime 200 |
| 109 | 4.94 | — | — | 95.00 Arcoprime 300 |
| 110 | 4.90 | — | — | 95.06 Arcoprime 400 |
| 111 | 5.05 | — | — | 95.10 Gascon 9 |
| 112 | 4.95 | — | — | 94.95 Gascon 58 |
| 113 | 4.94 | — | — | 95.05 Gascon 100 |
| 114 | 5.00 | — | — | 95.06 Gascon 150 |
| 115 | 4.96 | — | — | 95.00 Gascon 220 |
| 116 | 3.01 | 4.02 | 87.96 | 95.04 Arcoprime 70 |
| 117 | 3.00 | 4.01 | 87.75 | 5.01 Arcoprime 200 |
| 118 | 3.01 | 4.02 | 87.96 | 5.23 Arcoprime 300 |
| 119 | 2.99 | 3.99 | 87.31 | 5.01 Arcoprime 400 |
| 120 | 3.01 | 4.02 | 87.96 | 5.71 Gascon 9 |
| 121 | 3.01 | 4.02 | 87.96 | 5.01 Gascon 58 |
| 122 | 3.01 | 4.02 | 87.96 | 5.01 Gascon 100 |
| 123 | 3.01 | 4.02 | 87.96 | 5.01 Gascon 150 |
| 124 | 3.01 | 4.02 | 87.96 | 5.01 Gascon 220 |
| 125 | 3.01 | 4.00 | 83.02 | 5.01 Arcoprime 70 |
| 126 | 2.99 | 3.98 | 82.59 | 9.97 Arcoprime 200 |
| 127 | 3.00 | 4.00 | 82.84 | 10.44 Arcoprime 300 |
| 128 | 3.01 | 4.00 | 82.99 | 10.16 Arcoprime 400 |
| 129 | 3.01 | 4.00 | 82.99 | 10.01 Gascon 9 |
| 130 | 3.01 | 4.00 | 82.99 | 10.01 Gascon 58 |
| 131 | 3.02 | 4.02 | 83.27 | 10.01 Gascon 100 |
| 132 | 3.01 | 4.00 | 83.02 | 9.70 Gascon 150 |
| 133 | 3.01 | 4.01 | 83.19 | 9.97 Gascon 220 |
| 134 | 3.00 | 4.00 | 73.04 | 9.78 Arcoprime 70 |
| 135 | 3.00 | 4.00 | 73.01 | 19.96 Arcoprime 200 |

-continued

| Example No. | Weight Percent of | | | |
|---|---|---|---|---|
| | Kraton G-1651 | Kraton G-1701 | Regalrez 1018 | Mineral Oil |
| 136 | 2.98 | 3.98 | 72.62 | Arcoprime 300 20.00 |
| 137 | 3.00 | 4.00 | 72.96 | Arcoprime 400 20.43 |
| 138 | 3.01 | 4.01 | 73.28 | Gascon 9 20.04 |
| 139 | 3.00 | 4.00 | 73.01 | Gascon 58 19.70 |
| 140 | 2.98 | 3.98 | 72.65 | Gascon 100 20.00 |
| 141 | 2.97 | 3.96 | 72.41 | Gascon 150 20.39 |
| 142 | 3.00 | 4.00 | 73.04 | Gascon 220 20.66 |
| 143 | 2.98 | 3.98 | 62.96 | Arcoprime 70 19.96 |
| 144 | 3.00 | 4.00 | 63.22 | Arcoprime 200 30.07 |
| 145 | 2.99 | 3.99 | 63.06 | Arcoprime 300 29.79 |
| 146 | 2.99 | 3.99 | 63.06 | Arcoprime 400 29.97 |
| 147 | 2.99 | 3.99 | 63.06 | Gascon 9 29.97 |
| 148 | 2.99 | 3.99 | 63.06 | Gascon 58 29.97 |
| 149 | 2.99 | 3.99 | 63.06 | Gascon 100 29.97 |
| 150 | 2.99 | 3.99 | 63.03 | Gascon 150 29.97 |
| 151 | 2.99 | 3.99 | 63.06 | Gascon 220 30.00 |
| 152 | 3.01 | 4.01 | 53.28 | Arcoprime 70 29.97 |
| 153 | 3.00 | 3.99 | 53.03 | Arcoprime 200 39.69 |
| 154 | 2.99 | 3.99 | 53.00 | Arcoprime 300 39.98 |
| 155 | 2.99 | 3.99 | 52.92 | Arcoprime 400 40.01 |
| 156 | 3.01 | 4.01 | 53.28 | Gascon 9 40.10 |
| 157 | 3.00 | 4.00 | 53.16 | Gascon 58 39.69 |
| 158 | 2.99 | 3.99 | 52.92 | Gascon 100 39.83 |
| 159 | 2.99 | 3.99 | 53.00 | Gascon 150 40.10 |
| 160 | 3.00 | 4.00 | 53.00 | Gascon 220 40.01 |
| 161 | 2.98 | 4.04 | 42.99 | Arcoprime 70 40.00 |
| 162 | 2.98 | 4.04 | 42.99 | Arcoprime 200 49.99 |
| 163 | 2.98 | 4.04 | 42.99 | Arcoprime 300 49.99 |
| 164 | 2.99 | 4.06 | 43.16 | Arcoprime 400 49.99 |
| 165 | 2.99 | 4.06 | 43.16 | Gascon 9 49.79 |
| 166 | 2.99 | 4.06 | 43.14 | Gascon 58 49.79 |
| 167 | 2.98 | 4.04 | 42.99 | Gascon 100 49.82% |
| 168 | 2.98 | 4.04 | 42.99 | Gascon 150 49.99 |
| 169 | 2.96 | 4.19 | 43.60 | Gascon 220 49.99 |
| 170 | 3.00 | 4.00 | 32.99 | Arcoprime 70 49.26 |
| 171 | 3.00 | 4.00 | 32.99 | Arcoprime 200 60.01 |
| 172 | 3.01 | 4.01 | 33.08 | Arcoprime 300 60.01 |
| 173 | 3.00 | 4.00 | 32.96 | Arcoprime 400 59.90 |
| 174 | 3.04 | 4.05 | 33.38 | Gascon 9 60.04 59.54 |
| 175 | 3.01 | 4.02 | 33.14 | Gascon 58 59.82 |
| 176 | 3.00 | 3.99 | 32.93 | Gascon 100 60.08 |
| 177 | 3.00 | 4.00 | 32.99 | Gascon 150 60.01 |
| 178 | 3.00 | 4.00 | 32.99 | Gascon 220 60.01 |
| 179 | 3.01 | 4.03 | 23.08 | Arcoprime 70 69.87 |
| 180 | 3.01 | 4.03 | 23.06 | Arcoprime 200 69.91 |
| 181 | 3.04 | 4.07 | 23.30 | Arcoprime 300 69.59 |
| 182 | 2.99 | 4.01 | 22.95 | Arcoprime 400 70.05 |
| 183 | 3.00 | 4.02 | 23.03 | Gascon 9 69.94 |
| 184 | 2.99 | 4.01 | 22.94 | Gascon 58 70.05 |
| 185 | 3.00 | 4.02 | 23.03 | Gascon 100 69.94 |
| 186 | 3.04 | 4.07 | 23.30 | Gascon 150 69.59 |
| 187 | 3.00 | 4.02 | 22.97 | Gascon 220 70.01 |
| 188 | 3.03 | 4.03 | 13.09 | Arcoprime 70 79.85 |
| 189 | 3.04 | 4.05 | 13.15 | Arcoprime 200 79.76 |
| 190 | 3.00 | 4.00 | 12.99 | Arcoprime 300 80.01 |
| 191 | 3.00 | 4.00 | 12.99 | Arcoprime 400 80.01 |
| 192 | 3.06 | 4.08 | 13.25 | Gascon 9 79.60 |
| 193 | 2.99 | 3.99 | 12.95 | Gascon 58 80.07 |
| 194 | 3.00 | 3.99 | 12.97 | Gascon 100 80.04 |
| 195 | 3.00 | 4.00 | 12.99 | Gascon 150 80.01 |
| 196 | 3.02 | 4.02 | 13.05 | Gascon 220 79.91 |

| Discussion of results of Examples 2-196 | |
|---|---|
| Example No.: | Comments and Observations: |
| 2 | A sticky, viscous liquid. |
| 3 | Different properties from Example 2; somewhere between a pressure sensitive adhesive with some elastomeric qualities and a sticky liquid. When touched gently enough with a finger, the finger can be removed from the adhesive without leaving a residue; however, most of the time, because of the finger pressures imposed, a residue is left on the finger. Very soft film that stretches significantly when the finger is removed over it. Weak, tears easily. |
| 4 | A sticky, pressure sensitive adhesive that cleanly releases from the touch of a finger; allows the finger to be removed without leaving any apparent residue. The adhesive is very soft and stretches significantly when the finger is moved and after the finger is removed the adhesive very slowly recovers to nearly its original shape. This adhesive has better elastic recovery than example 3 The adhesive stronger than example 3 but still tears relatively easily. |
| 2-22 | As the amount of Kraton G-1651 was increased in small increments from 2% in example 4 to 40% in example 16 the adhesiveness appeared to decline steadily, while the speed of elastomeric recovery, completeness of elastomeric recovery, tear resis- |

-continued

Discussion of results of Examples 2-196

| Example No.: | Comments and Observations: |
|---|---|
| | tance and stiffness appeared to increase steadily. The distance that the adhesive would stretch elastically before releasing the finger decreased as the adhesive became more stiff. Example 4 through example 16 also had the unexpected quality of being reapplied a large number of times without any apparent loss of adhesiveness. Unlike most pressure sensitive adhesives, which suffer dramatic losses in adhesiveness once they have been applied and removed, these adhesives seem to remain sticky even after as many as 20 application and removal cycles. By example 8, which has 7.67% Kraton G-1651, the elastomeric characteristics of the material were sufficient enough so that the adhesive could be removed from the aluminum pan into which it had been cast and it would retain its shape with only mild distortion. By example 8 elastic recovery had become very rapid and appeared to be almost instantaneous. In the range between example 8 and example 19, where the amount of Kraton G-1651 ranged from 7.67% to 69.65%, the samples became more dimensionally stable and were easier to remove from their container as the amount of Kraton G-1651 increased. Example 20 (78.43% Kraton G-1651) through example 22 (100% Kraton G-1651), the materials cracked as the solvent evaporated, appeared to become weaker, and appeared to decrease in their ability to elastically recover from imposed strains as the percentage of Kraton G 1651 increased. The best peak strength and elastic recovery appeared to occur in the range from example 14 through example 16 which had from 24.84% to 40% Kraton G-1651. Example 14 was quite sticky and approximates the formula most suitable for pin free cork boards, while example 16 was less sticky and may be closer to the formula most suitable for making resealable injection site closures. Example 12 (17.98% Kraton G-1651) and example 13 (20.15% Kraton G-1651) also appear most suitable for the pin free cork board. When example 9 was removed from its tray and two surfaces were placed in contact with it a strong bond occurred and it was difficult to separate the two surfaces without damaging them. By example 12 (17.98% Kraton G-1651) the material was noticeably less adhesive than previous materials (materials with 14.91% Kraton G-1651 or less) and could be more easily separated once it was stuck to itself; however, it was still difficult to separate from itself with no damage. Like pressure sensitive adhesive tape, this material gets tangled easily and is hard to lay flat once tangled. It holds paper tightly but allows it to be removed without damage. Behavior is nearly like a rubber sheet with good retention of surface details as it is stretched and allowed to recover. As the quantity of Kraton G-1651 increased from 9.87% in example 9 to 20.15% in example 13, it became easier to separate the adhesive materials from itself, and at the Kraton levels of example 14 (24.84% Kraton G-1651), it was easy to separate from itself without significant damage to the material as viewed with the naked eye and unassisted by instrumentation. Examples 17 and 18, with 50% and 58.97% G-1651, respectively, did not exhibit any apparent adhesiveness when touched with one's fingers. They are rubbery with almost no tack and have excellent strain recovery. Example 19 (69.65% G-1651) had no surface tack, |
| | and doesn't recover from strain as well as example 17 and example 18. The remaining examples 20 through 22 (78.43% Kraton G-1651 up to 100% Kraton G-1651) were progressively weaker films as the amount of Kraton G-1651 was increased. They also cracked during drying. The amount of cracking increased with increasing percentages of Kraton G-1651 suggesting a desirability of having at least about 30% Regalrez 1018 in every formula containing just these two materials alone. |
| 23-26 | In this next series, mixtures of Kraton G-1701 to Regalrez 1018 are explored. At 5% Kraton G-1701 the mixture is a viscous, sticky fluid. As the percentage of G-1701 is increased, first to 10.00% Kraton G-1701, then to 19% Kraton G-1701, the materials remain sticky fluids but dramatic increases in viscosity are observed. Finally, at 50% Kraton G-1701 the material has the texture and appearance of a soft wax and can be shaped in one's hands without leaving any apparent residue. |
| 27-34 | Mixtures of Kraton G-1651, Kraton G-1701, Regalrez 1018 are evaluated. Example 27 has excellent adhesive properties. It stretches extensively and recovers to near its original shape when one's finger is pulled free. It leaves no apparent residue on the finger. As the amounts of the two Kratons is increased each successive example appears to be a little less adhesive and a little more stiff than its predecessor. Also, the amount each examples film stretches when one's finger is pulled away from its surface appears to decrease with each successive example. By the last example in the series, example 34 which contains 9.87% Kraton G-1651, 19.88% Kraton G-1701 and 75.59% Regalrez 1018, the adhesion is considerably lower than that of example 27. |
| 35-61 | Example 35 through example 196 contain varying amounts of different types of mineral oil. The corresponding data applies to this series of mineral oils. Example 35 through example 61 appear to be nearly identical. As compared to the adhesive film example 7, they appear to have similar stickiness and equally good recovery. They do, however, have a noticeably more comfortable feel when removed from the aluminum trays. |
| 62-66 | Example 62 through example 66 have low adhesiveness, are very soft and have good elastomeric properties. They were easily removed from the tray in which they had been casted and could be folded back on themselves and separated easily. The tactile feel was similar to human skin, only much softer. These materials can be used to hold paper. The paper can be removed by gentle pulling without removing any of the ink or tearing the paper. As with most of examples 2-196, repeated contact with the surface does not cause a loss of adhesiveness. In the series from example 62 through example 65, the ability to hold a shape seemed to be best with example 62. The adhesive film of example 66 was quite similar to the adhesive film of example 62. |
| 67-70 | Examples 67 through 70 tend to be much more adhesive than examples 62 through 66 and tend to exhibit much greater strains when touched. They tend to undergo slight surface damage when touched and leave a thin residue on the finger. The amount of residue tended to increase in going from example 67 to example 70. |
| 71-74 | Example 71 was tackier than example 62 probably due to its greater softness. This was surprising because, until now, only decreases in |

Discussion of results of Examples 2–196

| Example No.: | Comments and Observations: |
|---|---|
| | tackiness were observed as mineral oil was used to replace Regalrez 1018 in the formula. Example 72 through example 74 were similar to example 71 but the films made were progressively softer and progressively easier to induce damage surface. |
| 75–79 | The film of example 75 is quite similar to the film of example 71. Examples 75 through example 79 seemed to have very thin, sticky surface residues on the films which come off on ones fingers. Example 77 through example 79 generated progressively softer films. They are quite similar to those of examples 71–74. |
| 80–83 | The films of examples 81–83 were softer and easier to induce surface damage in than were those of examples 71–73. The series of films starting with example 84 and ending with example 88 were more stable than the films from corresponding example 75 through example 79. The residue forming material observed in example 75 through example 79 was not observed in these examples. |
| 89–92 | The series of films from example 89 through example 92 seemed to be more stable and much less adhesive than the elastomers in example 80 through example 83. They were very soft materials. As the examples progressed from example 80 to example 83 they became softer, easier to induce surface damage, and less capable of full elastic recovery from strains. There was a very thin surface residue on example 83. |
| 93–97 | The film of example 93 was similar to the film of example 89 only slightly stickier. The films of example 93 through example 97 were progressively stickier. All were fairly stable elastomers. |
| 98–101 | The series of films from examples 98 through 101 was quite soft. The film from example 98 was a soft elastomer with no apparent surface residue. The film of example 99 had very slight surface residue and greater tack. Example 100 and example 101 produced films that had slightly greater tack and a more apparent residue. |
| 102–106 | The film of example 102 was quite similar to that of example 98. As the series progressed from example 103 to example 106, greater tack and softness were observed for the films produced. |
| 107–110 | The film series from example 107 to example 110 had less tack than the series from example 98 to example 101 and surface residue was no longer apparent. |
| 111–115 | The film series from example 111 to example 115 increased in tack from almost none to moderate tack. All of the films seemed to be stable elastomers. |
| 116–151 | The remaining experiments, example 116 through example 196, showed a combination of mineral oil of 9 different types combined with Kraton G-1651, Kraton G-1701, and Regalrez 1018. Within each mineral oil level, those with the higher Saybolt seconds varieties of the paraffinic mineral oils seemed to be slightly stickier than those with the lower Saybolt second paraffinic mineral oils. Likewise, those with the higher Saybolt second naphthenic mineral oils appeared to be slightly stickier than those with the lower Saybolt second naphthenic mineral oils. The film series from example 116 to example 151 appeared to be nearly identical except for the minor variations in properties discussed above. They were similar to example 29 but noticeably gentler to the skin when the finger was removed. |
| 152–160 | The film series members with about 40% mineral oil (example 152 through example 160) were nearly identical to each other but had noticeably lower tack than those with 30% mineral oil or less (example 116 through example 151). |
| 161–169 | The series members with about 50% mineral oil (example 161 through example 169) were noticeably less tacky than those with about 40% mineral oil. |
| 170–196 | The series members with about 60% mineral oil (example 170 through example 178) were noticeably less tacky than those with about 50% mineral oil (example 161 through example 169) The tack appeared to decrease further when the amount of mineral oil was increased to 70% (example 179 through example 187) and further still as it was increased to 80% (example 187 through example 196). The higher the amount of mineral oil used the more pronounced the previously mentioned effects of increasing tack with increasing viscosity. Example 196 (which used the most viscous naphthenic mineral oil) was still a good adhesive while example 184 (which used the lowest viscosity naphthenic mineral oil) and 180 (which used the lowest viscosity paraffinic mineral oil) were not nearly as sticky. It is noteworthy that the thin residue films encountered in some examples which did not contain Kraton G-1701 did not occur when the formula contained the Kraton G-1701. This may have been due to a larger amount of Kraton in the total formula. |

I claim:

1. Adhesive films, at least 1 mil thick, comprising an essentially homogeneous mixture containing, based on 100% of the solids weight of the adhesive, (i) at least 20 weight % of a low molecular weight resin produced by the polymerization and hydrogenation of styrenic monomer feedstock having a ring and ball softening point of about 10°–45° C., (ii) from about 2 to about 40 weight % of a triblock copolymer of an ethylene-1-butylene copolymer elastomer containing polystyrene end polymer groups having a styrene polymer or oligomer block to ethylene-butylene rubber block weight ratio of about 0.45 to about 0.55 alone or in combination with a diblock copolymer of a hard thermoplastic block and a saturated, soft ethylene-propylene polymeric block, and (iii) up to about 80 weight % of a mineral oil.

2. The adhesive film of claim 1 wherein the adhesive film is a fashion adhesive film and the low molecular weight resin comprises at least 75 weight % of the adhesive film and the triblock copolymer alone or in combination with the diblock copolymer comprises about 2 to about 10 weight % of the adhesive film.

3. The adhesive film of claim 2 wherein the mineral oil comprises less than 30 weight % of the adhesive film.

4. The adhesive film of claim 3 wherein the mineral oil comprises about 2 to about 20 weight % of the adhesive film.

5. The adhesive film of claim 3 wherein the mineral oil has a viscosity of about 200 to about 1,200 Saybolt Universal seconds, determined at 38° C.

6. The adhesive film of claim 1 wherein the adhesive film is a repair adhesive film and is free of mineral oil as an additive.

7. The adhesive film of claim 4 wherein a diblock copolymer is provided in the adhesive film.

8. The adhesive film of claim 2 wherein there is present a solvent in the amount such that the solids content of the solvent containing adhesive film is about 20 to about 80 weight percent.

9. The adhesive film of claim 8 wherein the solvent is from the class of halogenated hydrocarbons and terpene hydrocarbons.

10. The adhesive film of claim 9 wherein the solvent is one of 1,1,1-trichloroethane and dipentene.

11. The adhesive film of claim 1 wherein the triblock copolymer is a styrene-ethylene-butylene-styrene block copolymer.

12. The adhesive film of claim 1 in the form of one of a solvent borne fashion adhesive film, a hot melt coated film on a decorative object, a pin-free adhesive board, a high strength adhesive for difficult to bond surfaces, a facemask and hairpiece pressure sensitive adhesive, a small appliance and instrument holder, a compression load adhesive, and a resealable film for closure and pneumatic membranes.

* * * * *